US009292688B2

(12) United States Patent
Avasarala et al.

(10) Patent No.: US 9,292,688 B2
(45) Date of Patent: Mar. 22, 2016

(54) SYSTEM AND METHOD FOR AUTOMATED MACHINE-LEARNING, ZERO-DAY MALWARE DETECTION

(71) Applicant: Northrop Grumman Systems Corporation, Falls Church, VA (US)

(72) Inventors: Bhargav R. Avasarala, Arlington, VA (US); Brock D. Bose, Alexandria, VA (US); John C. Day, Palm Bay, FL (US); Donald Steiner, McLean, VA (US)

(73) Assignee: NORTHROP GRUMMAN SYSTEMS CORPORATION, Falls Church, VA (US)

(*) Notice: Subject to any disclaimer, the term of this patent is extended or adjusted under 35 U.S.C. 154(b) by 0 days.

(21) Appl. No.: 14/038,682

(22) Filed: Sep. 26, 2013

(65) Prior Publication Data

US 2014/0090061 A1    Mar. 27, 2014

Related U.S. Application Data

(60) Provisional application No. 61/705,938, filed on Sep. 26, 2012.

(51) Int. Cl.
*H04L 29/06* (2006.01)
*G06F 21/56* (2013.01)

(52) U.S. Cl.
CPC .............. *G06F 21/56* (2013.01); *G06F 21/564* (2013.01); *G06F 21/566* (2013.01)

(58) Field of Classification Search
CPC ...... G06F 21/56; G06F 21/564; G06F 21/566
USPC ........................................................... 726/24
See application file for complete search history.

(56) References Cited

U.S. PATENT DOCUMENTS

| 5,675,711 | A | 10/1997 | Kephart et al. |
| 6,141,241 | A | 10/2000 | Ovshinsky et al. |
| 7,065,657 | B1 | 6/2006 | Moran |
| 7,072,876 | B1 * | 7/2006 | Michael ............... G06N 99/005 706/12 |

(Continued)

OTHER PUBLICATIONS

Learning to Detect and Classify Malicious Executables in the Wild, Journal of Machine Learning Research 7 (Dec. 2006) pp. 2721-2744, J. Zico Kolter et al.

(Continued)

*Primary Examiner* — David Garcia Cervetti
(74) *Attorney, Agent, or Firm* — Andrews Kurth LLP; Sean S. Wooden

(57) ABSTRACT

Improved systems and methods for automated machine-learning, zero-day malware detection. Embodiments include a method for improved zero-day malware detection that receives a set of training files which are each known to be either malign or benign, partitions the set of training files into a plurality of categories, and trains category-specific classifiers that distinguish between malign and benign files in a category of files. The training may include selecting one of the plurality of categories of training files, identifying features present in the training files in the selected category of training files, evaluating the identified features to determine the identified features most effective at distinguishing between malign and benign files, and building a category-specific classifier based on the evaluated features. Embodiments also include by a system and computer-readable medium with instructions for executing the above method.

16 Claims, 12 Drawing Sheets

(56) References Cited

U.S. PATENT DOCUMENTS

| | | | | |
|---|---|---|---|---|
| 7,448,084 B1* | 11/2008 | Apap | | G06F 21/552 726/22 |
| 7,487,544 B2 | 2/2009 | Schultz et al. | | |
| 7,519,998 B2 | 4/2009 | Cai et al. | | |
| 7,979,907 B2 | 7/2011 | Schultz et al. | | |
| 8,015,284 B1* | 9/2011 | Isenberg | | G06F 21/51 709/224 |
| 8,037,535 B2 | 10/2011 | Maloof | | |
| RE43,103 E* | 1/2012 | Rozman | | G06F 21/53 709/225 |
| 8,099,785 B1* | 1/2012 | Pavlyushchik | | G06F 21/55 726/22 |
| 8,104,090 B1* | 1/2012 | Pavlyushchik | | G06F 21/55 713/188 |
| 8,161,548 B1* | 4/2012 | Wan | | G06F 21/566 713/188 |
| 8,171,551 B2* | 5/2012 | Muttik | | G06F 21/564 713/188 |
| 8,181,247 B1* | 5/2012 | Pavlyushchik | | G06F 21/552 726/22 |
| 8,190,647 B1* | 5/2012 | Pereira | | G06F 21/562 707/749 |
| 8,250,655 B1* | 8/2012 | Malanov | | H04L 63/145 713/165 |
| 8,341,745 B1* | 12/2012 | Chau | | G06F 21/56 709/223 |
| 8,401,982 B1* | 3/2013 | Satish | | G06F 21/566 706/12 |
| 8,413,235 B1* | 4/2013 | Chen | | G06F 21/552 713/188 |
| 8,413,244 B1* | 4/2013 | Nachenberg | | H04L 63/145 713/188 |
| 8,448,218 B2* | 5/2013 | Bori | | G06F 21/51 726/1 |
| 8,453,242 B2* | 5/2013 | Chandnani | | G06F 21/56 713/188 |
| 8,478,708 B1* | 7/2013 | Larcom | | G06Q 10/10 706/52 |
| 8,521,667 B2* | 8/2013 | Zhu | | G06F 21/56 706/13 |
| 8,555,388 B1* | 10/2013 | Wang | | H04L 63/1416 709/245 |
| 8,561,180 B1* | 10/2013 | Nachenberg | | G06F 21/562 726/22 |
| 8,561,195 B1* | 10/2013 | Chen | | G06F 21/562 726/22 |
| 8,561,196 B1* | 10/2013 | Viljoen | | G06F 21/564 717/170 |
| 8,578,497 B2* | 11/2013 | Antonakakis | | G06F 21/577 709/224 |
| 8,584,241 B1* | 11/2013 | Jenks | | G06F 21/566 726/23 |
| 8,590,045 B2* | 11/2013 | Niemela | | G06F 21/566 726/24 |
| 8,627,469 B1* | 1/2014 | Chen | | H04L 63/14 726/22 |
| 8,635,171 B1* | 1/2014 | Kennedy | | G06K 9/6256 706/12 |
| 8,667,593 B1* | 3/2014 | Shnitzer | | G06F 21/564 726/22 |
| 8,682,812 B1* | 3/2014 | Ranjan | | H04L 63/1425 706/12 |
| 8,683,585 B1* | 3/2014 | Chen | | G06F 21/56 726/22 |
| 8,719,924 B1* | 5/2014 | Williamson | | G06F 21/568 713/188 |
| 8,726,388 B2* | 5/2014 | Turbin | | G06F 21/552 726/24 |
| 8,745,760 B2* | 6/2014 | Poulson | | G06F 21/51 707/999.1 |
| 8,769,678 B2* | 7/2014 | Dubrovsky | | H04L 63/0245 380/30 |
| 8,799,190 B2* | 8/2014 | Stokes | | G06F 21/563 706/12 |
| 8,826,431 B2* | 9/2014 | Pereira | | G06F 21/566 713/188 |
| 8,832,829 B2* | 9/2014 | Manni | | G06F 21/566 726/22 |
| 8,838,992 B1* | 9/2014 | Zhu | | G06F 21/56 713/164 |
| 8,875,294 B2* | 10/2014 | Golavanov | | G06F 21/564 726/22 |
| 2003/0065926 A1* | 4/2003 | Schultz | | G06F 21/562 713/188 |
| 2003/0074573 A1* | 4/2003 | Hursey | | G06F 21/564 726/22 |
| 2003/0131256 A1* | 7/2003 | Ackroyd | | G06F 21/552 726/23 |
| 2005/0015606 A1* | 1/2005 | Blamires | | G06F 21/575 713/188 |
| 2005/0021994 A1* | 1/2005 | Barton | | G06F 21/562 726/26 |
| 2005/0027686 A1* | 2/2005 | Shipp | | G06F 21/562 |
| 2005/0262567 A1* | 11/2005 | Carmona | | G06F 21/564 726/24 |
| 2006/0037080 A1* | 2/2006 | Maloof | | G06F 21/562 726/24 |
| 2006/0095971 A1* | 5/2006 | Costea | | G06F 21/56 726/26 |
| 2007/0039052 A1* | 2/2007 | Chandnani | | G06F 21/56 726/24 |
| 2007/0100905 A1* | 5/2007 | Masters | | G06F 21/568 |
| 2007/0168547 A1* | 7/2007 | Krywaniuk | | H04L 63/0227 709/238 |
| 2007/0174270 A1* | 7/2007 | Goodwin | | G06F 17/30864 |
| 2007/0174911 A1* | 7/2007 | Kronenberg | | G06F 21/56 726/22 |
| 2007/0240221 A1* | 10/2007 | Tuvell | | G06F 21/56 726/24 |
| 2007/0266421 A1* | 11/2007 | Vaidya | | H04L 63/20 726/1 |
| 2007/0277241 A1* | 11/2007 | Repasi | | G06F 21/562 726/24 |
| 2008/0016570 A1 | 1/2008 | Capalik | | |
| 2008/0047012 A1* | 2/2008 | Rubin | | G06F 21/552 726/23 |
| 2008/0127336 A1* | 5/2008 | Sun | | G06F 21/566 726/22 |
| 2008/0141371 A1* | 6/2008 | Bradicich | | G06F 21/56 726/23 |
| 2008/0177680 A1* | 7/2008 | Laxman | | G06K 9/6256 706/12 |
| 2008/0177684 A1* | 7/2008 | Laxman | | G06K 9/6256 706/20 |
| 2008/0201778 A1* | 8/2008 | Guo | | G06F 21/552 726/23 |
| 2008/0201779 A1* | 8/2008 | Tahan | | G06F 21/564 726/23 |
| 2008/0263669 A1* | 10/2008 | Alme | | G06F 21/56 726/24 |
| 2009/0013405 A1* | 1/2009 | Schipka | | H04L 63/145 726/22 |
| 2009/0094175 A1* | 4/2009 | Provos | | G06F 21/577 706/12 |
| 2009/0192979 A1* | 7/2009 | Lunde | | G06F 17/30943 |
| 2009/0241194 A1* | 9/2009 | Thomas | | G06F 21/53 726/24 |
| 2009/0300765 A1* | 12/2009 | Moskovitch | | G06F 21/562 726/24 |
| 2009/0313700 A1* | 12/2009 | Horne | | G06F 21/564 726/24 |
| 2010/0064369 A1* | 3/2010 | Stolfo | | G06F 21/56 726/24 |
| 2010/0077479 A1* | 3/2010 | Viljoen | | G06F 21/577 726/23 |
| 2010/0154063 A1* | 6/2010 | Hutton | | G06F 21/562 726/24 |
| 2010/0162395 A1* | 6/2010 | Kennedy | | G06F 21/563 726/23 |
| 2010/0180344 A1* | 7/2010 | Malyshev | | G06F 21/566 726/23 |
| 2010/0192222 A1* | 7/2010 | Stokes | | G06F 21/563 726/22 |

(56) References Cited

U.S. PATENT DOCUMENTS

| | | | |
|---|---|---|---|
| 2010/0229239 A1 | 9/2010 | Rozenberg et al. | |
| 2011/0004935 A1* | 1/2011 | Moffie | G06F 21/53 726/23 |
| 2011/0162070 A1 | 6/2011 | Krasser et al. | |
| 2012/0084859 A1* | 4/2012 | Radinsky | G06F 21/56 726/23 |
| 2012/0158626 A1* | 6/2012 | Zhu | H04L 63/1408 706/13 |
| 2012/0260342 A1* | 10/2012 | Dube | G06F 21/564 726/24 |
| 2013/0198841 A1* | 8/2013 | Poulson | G06F 21/566 726/23 |
| 2013/0291111 A1* | 10/2013 | Zhou | G06F 21/562 726/23 |
| 2013/0326625 A1* | 12/2013 | Anderson | G06F 21/56 726/23 |
| 2014/0123290 A1* | 5/2014 | Li | G06F 21/568 726/24 |
| 2014/0150105 A1* | 5/2014 | Yu | G06F 21/562 726/24 |
| 2014/0181973 A1* | 6/2014 | Lee | G06F 21/562 726/23 |
| 2014/0298460 A1* | 10/2014 | Xue | H04L 63/1483 726/23 |

OTHER PUBLICATIONS

Selecting Features to Classify Malware, 2012 Adobe Systems Incorporated, Karthik Raman, Security Researcher, Adobe PSIRT. Due to size of this non patent literature, it was uploaded as two parts (Part 1 and Part 2).

* cited by examiner

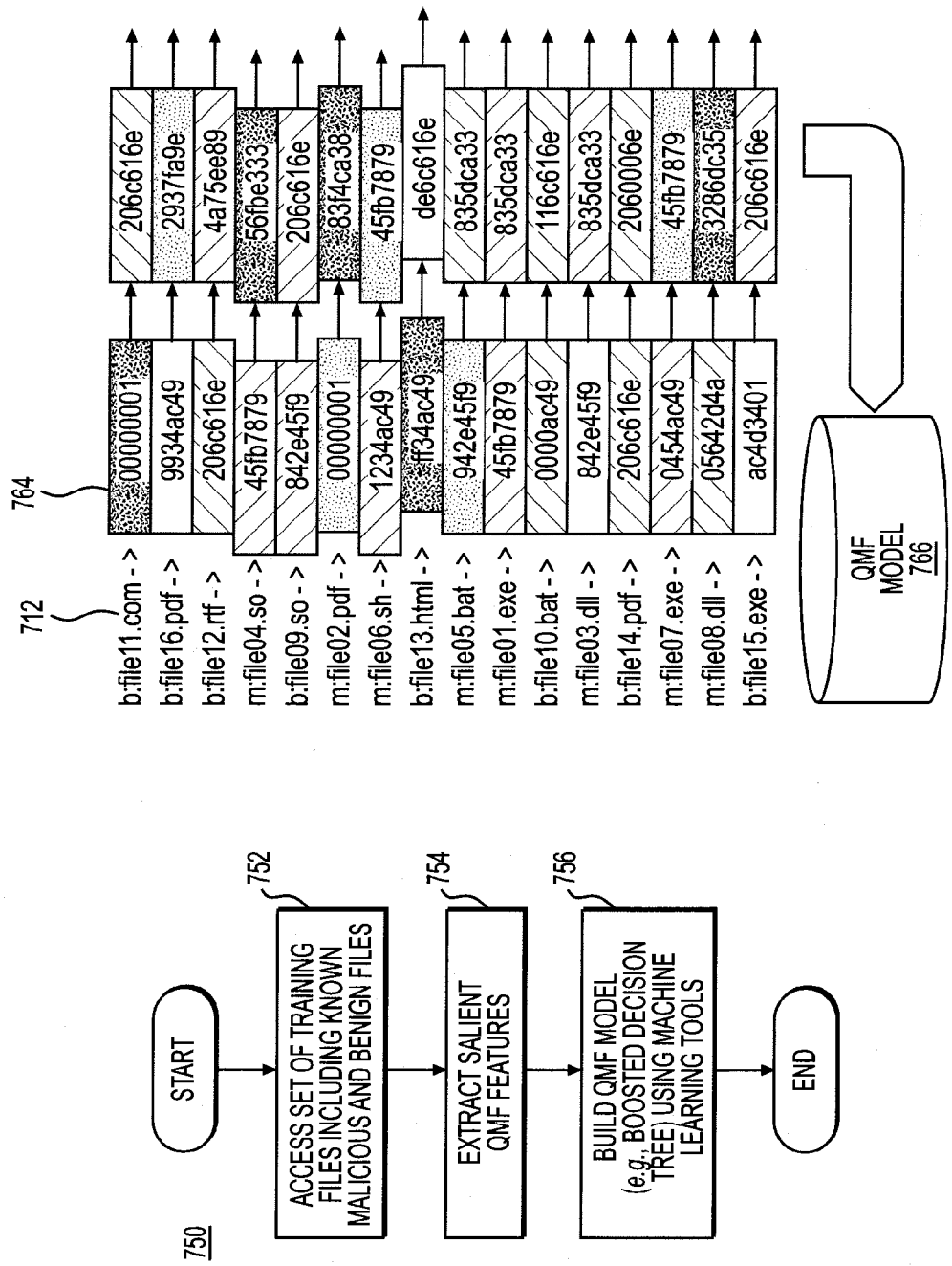

SYSTEM AND METHOD FOR AUTOMATED MACHINE-LEARNING, ZERO-DAY MALWARE DETECTION

CROSS REFERENCE TO RELATED APPLICATIONS

This application claims priority from U.S. Provisional Patent Appl. No. 61/705,938, filed on Sep. 26, 2012, which is hereby incorporated herein by reference in its entirety.

BACKGROUND

Detection of cyber intrusion attempts is a key component to cyber security. Current commercial anti-virus and intrusion detection software (IDS) rely largely on signature-based methods to identify malicious code before the malicious code can cause harm to computer systems. However, signature-based mechanisms are ineffective against zero-day exploits since the signature of zero-day malware is, by definition, unknown as the malware has not previously been identified as such.

Commercial IDSs, such as provided by McAfee, Symantec, or Sophos, rely on a signature-based approach to identifying malicious code. The signature, essentially a finger-print for malware, must already be known and deployed on the current system, usually through an anti-virus update or patch, for the IDS software to be able to detect the threat. This paradigm has several significant drawbacks:

The increasing rate at which new strains of malware are introduced means that ever increasing resources must be dedicated to generating, storing, and accessing malware signatures.

Even small alterations to existing malware render them invisible to signature detection, and The very nature of the signature generation process dictates that zero-day malware will be invisible until a sample can be identified, isolated, and analyzed. Only until then can a signature be generated and pushed out to the intrusion detection systems.

Consequently, the problem is that zero-day malware that has not been seen before must be identified as rapidly as possible while maintaining high accuracy by reducing both false negatives (amount of malware erroneously classified as not malware) and false positives (amount of non-malware erroneously classified as malware). Mechanisms must be developed that can identify zero-malware quickly and with high accuracy (including few false alarms).

Generally there are two broad types of automated malware detection systems: 1) Instance Matching (signature-based methods) and 2) Class Matching.

1) As discussed above, instance-matching (also called "template-matching") detectors operate by memorizing and exactly matching byte patterns (a signature) within a specific instance of a malware. The resulting template is effective for identifying other exact instances of the same malware. Though conceptually simple to implement, as discussed above there are several major disadvantages to this methodology:

a. Many thousands of templates are needed to cover the entire malware domain.

b. Not effective against new ("zero-day") threats because it takes time (on the order of many hours or days) to analyze the newly discovered threats and distribute effective templates to recognize them.

c. Instance-matching templates are "brittle" in the sense that malware authors can easily mitigate them by minor editing of the software codes. In fact, normal evolution of software often renders templates ineffective against new variants of the same malware codes.

2) Class-matching malware detectors are a fairly new development, designed to mitigate the shortcomings of instance-matching detectors. The main idea in class-matching malware detectors is to use machine-learning techniques to construct models that recognize entire classes of malware that share a common set of "features" such as specific sets of byte codes ("n-grams") or the relative frequency of occurrence of key byte-patterns. These models consist of classification rules sets or decision trees which infer the malicious nature of a particular instance of software, based on the presence or absence of key byte code patterns. The models are derived from analysis of the features of known malicious and benign sets (the "training set").

These models are more difficult to create but have several advantages over instance-matching detectors:

a. They can classify instances that were not in the training set, based on shared characteristic patterns, and, therefore, can be effective against zero-day threats.

b. The byte patterns tend to be very short and position independent and, therefore, are not as brittle as instance-matching templates.

c. Fewer models are required because each model can cover a broad set of instances.

The class-matching approach uses information theory and machine-learning techniques to identify general "features" of known malware through a "classifier" and to use the presence of these features to identify an unknown file as malware or not. This paradigm eliminates the need to know exactly what you are looking for in order to be able to find it. Specifically, the "classifier" is a decision tree based on "features" (n-grams, or sequences of n consecutive bytes; a good value for n is 4) present in either a binary file or in a system call or execution trace generated by execution of the file. The classifier is created by applying machine-learning algorithms (training) on a set of known malware and known benignware. Work on machine-learning based intrusion detection systems has generally only been pursued at the academic level. These academic approaches have generally used only a small set (less than 1,000 files) of malware to train on, yielding poor accuracy for a wide number of files.

Despite the advantages class-matching detectors have over instance-matching detectors, class-matching detectors also have problems. For example, class-matching detectors tend to have higher false-alarm rates because they rely on byte code patterns contained in training sets containing specific examples of malicious and benign software. Benign software with similar byte sequences to malicious software may be mistakenly classified as malicious. Since the classifiers generally return a probability that the file is malicious, the false alarm rate can be reduced, at the expense of the detection rate, by increasing the threshold above which a file is flagged as malicious. Instance matching techniques, by their very nature, are generally immune to false alarms. Class-matching detectors also have been extremely slow and time-consuming to operate, consequently ineffective in a commercial or practical setting.

Examples of known class-matching methods are described in Kolter, J. Z. and Mallof, M. A. "*Learning to detect and classify malicious executables in the wild.*" *Journal of Machine Learning Research* 7 (2006) ("Kolter-Maloof"), U.S. Pat. No. 8,037,535 to Maloof, U.S. Pat. No. 7,519,998 to Cai, U.S. Pat. No. 7,487,544 to Schultz et al., and U.S. P.G.Pub. No. 20090300765 to Moskovitch et al. These publications do not provide solutions to the above-described problems of high false-alarm rates or ineffectiveness and have only been demonstrated in academic settings.

SUMMARY

Described herein are embodiments of systems and methods that overcome the disadvantages of the prior art and provide improved systems and methods for automated machine-learning, zero-day malware detection. These advantages and others may be achieved by, for example, by a method for improved zero-day malware detection that receives a set of training files which are each known to be either malign or benign, partitions the set of training files into a plurality of categories, and trains category-specific classifiers that distinguish between malign and benign files in a category of files. The training may include selecting one of the plurality of categories of training files, identifying features present in the training files in the selected category of training files, evaluating the identified features to determine the identified features most effective at distinguishing between malign and benign files, and building a category-specific classifier based on the evaluated features. These advantages may also be achieved by a system and computer-readable medium with instructions for executing the above method. It is noted that the above method may alternatively or additionally be employed in a similar manner to identify and/or detect benign files.

These advantages and others may also be achieved by, for example, method for improved zero-day malware detection that receives a set of training files which are each known to be either malign or benign, analyzes a training file from the set of training files to determine features of the training file, tags the determined features of the training file with qualified meta-features (QMF) tags, repeats the analyzing and tagging for remaining training files in the set of training files, and builds a model identifying features indicative of a malign file using the QMF-tagged features, wherein the model is capable of being used to detect malign files. The tagging includes extracting one of the determined features from the training file, identifying a location of the extracted feature in the training file, determining an appropriate QMF tag of the extracted feature based on the identified location, applying the determined QMF tag to the extracted feature and repeating the extracting, identifying, determining and applying for the remaining determined features of the training file. These advantages may also be achieved by a system and computer-readable medium with instructions for executing the above method. It is noted that the above method may alternatively or additionally be employed in a similar manner to identify and/or detect benign files.

These advantages and others may also be achieved by, for example, method for improved zero-day malware detection that receives a set of training files which are each known to be either malign or benign, analyzes the set of training files to determine features of the training files, receives a feature set description that includes a semantic label for each attribute class present in the training files and a set of corresponding attributes that make up the attribute class, generates a plurality of attribute class-specific feature vectors (FVs) for the training files using the determined features and the feature set description, wherein the FVs are vectors of features present in malign files of the attribute class, concatenates the plurality of attribute class-specific FVs into an extended feature vector (EFV) for the training files, and generates a target file classifier based on the EFV using a plurality of classifier algorithms. These advantages may also be achieved by a system and computer-readable medium with instructions for executing the above method. It is noted that the above method may alternatively or additionally be employed in a similar manner to identify and/or detect benign files.

BRIEF DESCRIPTION OF THE DRAWINGS

The following detailed description of embodiments, will be better understood when read in conjunction with the appended drawings. It should be understood that the invention should not be limited to the precise arrangements and instrumentalities shown. In the drawings:

FIG. 7B is a flowchart and diagram illustrating an embodiment of an improved system and method for automated machine-learning, zero-day malware detection using QMF.

DETAILED DESCRIPTION

Described herein are embodiments of an improved system and method for automated machine-learning, zero-day malware detection. Embodiments include a composite classifier useful for malware detection. Embodiments include an extensible feature vector generator (EFVG) that facilitates and manages the addition or removal of attributes, attribute classes and corresponding feature derivation methods in a machine-learning system. Embodiments include a qualified meta-features (QMF) feature extraction algorithm for increasing accuracy and reducing "false positive" errors in malware detection. Embodiments provide improvements in malware detection over known systems and methods. Embodiments provide significant improvements over instance-matching, or signature-based, malware detection; for example, embodiments enable improved zero-day malware detection. Embodiments also provide significant improvements over class-matching malware protection; for example, embodiments enable zero-day malware detection with a much lower rate of false alarms and higher operational efficiency.

A composite classifier is an operational technique for improving the accuracy of machine-learning based malware detection techniques. In other words, embodiments will classify true malware more accurately (i.e., reduce false negatives) while committing fewer errors of mistaken identity (i.e., reduce false positives). Embodiments form distinct categories of files by using "external" attributes of a file, i.e., attributes that can be determined without executing the file or without in-depth knowledge of the file's structure. Such categories may include file type (e.g., pdf, doc, executable, etc. . . . ). Embodiments may determine file type or other external attributes using a number of techniques, such as using the file extension or the libmagic library (used by the Linux 'file' command), to categorize files. For each of these categories, a separate classifier (usually a decision tree) may be generated using machine-learning techniques based on known samples of malicious and benign files in that category. Embodiments may combine these classifiers into a composite classifier residing in a zero-day malware detection system.

Embodiments of the malware detection system utilizing a composite classifier may pre-screen a file under consideration to first determine its category. After pre-screening, embodiments may then use the corresponding classifier tailored to the file's category to classify the file as benign or malicious. Using the composite classifier as described, embodiments substantially improve on known class-detection systems that utilize a single generic classifier developed for all files regardless of category. Embodiments, therefore, provide a higher accuracy. Moreover, embodiments are more efficient in that files are analyzed only against classifiers applicable to a file type, as opposed to all classifiers, which are necessarily more and, therefore, take longer to apply.

Figure 1:
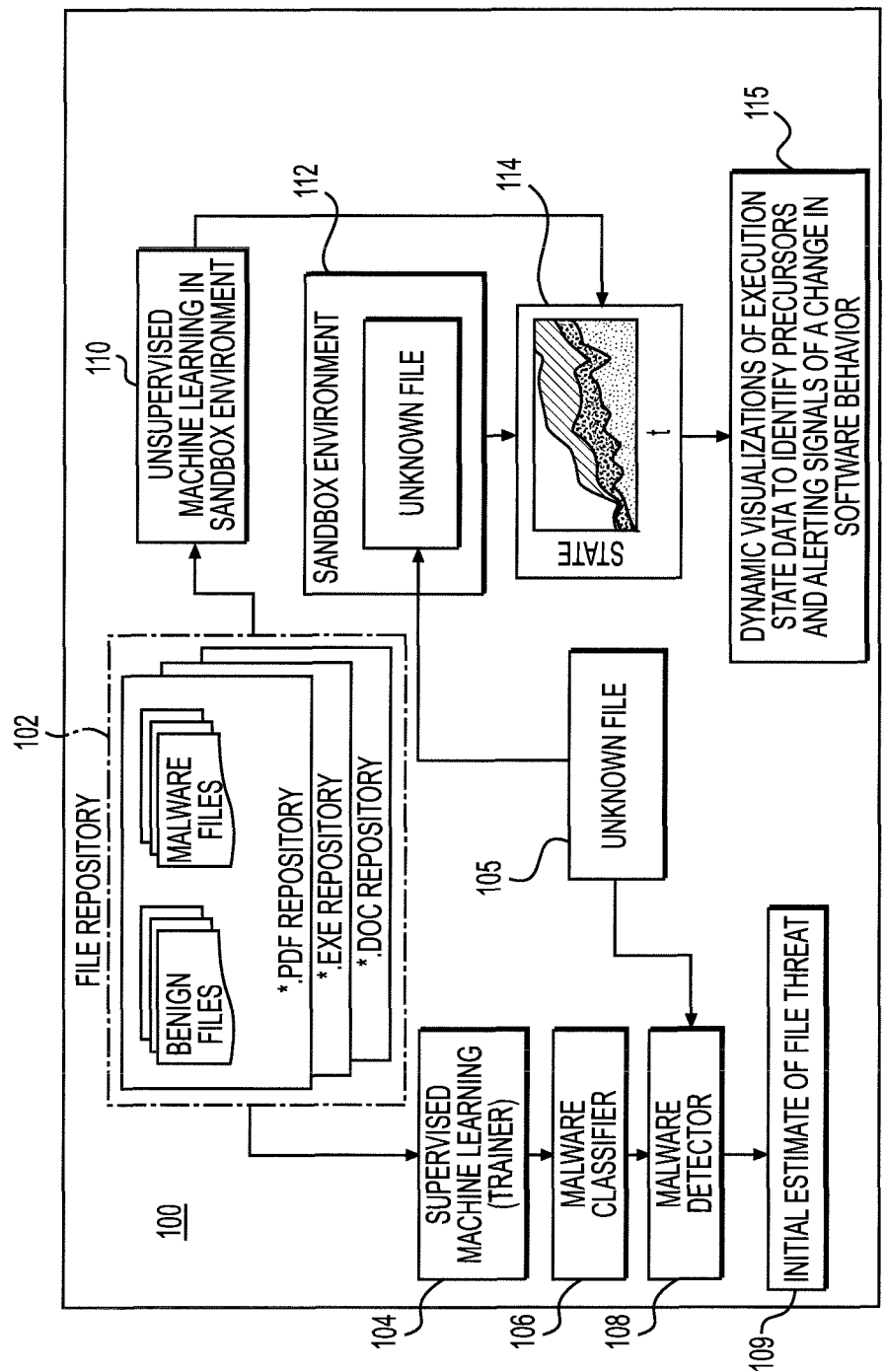
FIG. 1 is a block diagram illustrating an embodiment of a system and method for automated machine-learning, zero-day malware detection.

With reference to FIG. 1, shown is a block diagram of an embodiment of a system and method for automated machine-learning, zero-day malware detection. The embodiment shown illustrates a malware detection system 100 in which the composite classifier may be used to provide improved malware detection. The embodiment includes a repository of files 102 known to be malign (malware) and benign (e.g., a "training repository"). Such a repository 102 may include a variety of file types, e.g., .pdf, .exe, .doc, etc. A machine-learning program, application, routine, programmed logic circuit, or other automated machine-learning implementation (a "machine-learning trainer 104") may be executed on the repository of files to identify features that are indicative of a file being malware. Such features may be n-grams, or sequences of n consecutive bytes (e.g., n may be 4, but n may be other values, including 4, 6, 8, although experiments have shown that a value of 4 generally works best) present in either a binary file or in a system call or execution trace generated by execution of the file. The machine-learning trainer 104 analyzes the files in the repository of files to determine n-grams that are commonly, as well as uncommonly, found in the malign files in the repository, or in the system calls or execution traces generated by execution of the file (accordingly, the machine-learning trainer may execute files in a, e.g., sandbox or safe environment (e.g., where execution will do no harm) in order to analyze the system calls and/or execution traces generated by execution of the file.

Using the n-grams, the machine-learning trainer 104 creates binary feature vector representations of each file in the training repository. The machine-learning trainer 104 evaluates the features of the entire training collection to identify a subset of those that are the most effective at distinguishing between malign and benign files. The machine-learning trainer 104 may perform this feature selection and extraction analysis as described in, for example, Kolter-Maloof. The machine-learning trainer 104 may include settings that indicate how frequently a feature must appear in malign files to be considered a good indicator of malware and, therefore, a malware classifier. The frequency setting may also be set relative to how often the feature appears, if at all, in benign files. A given feature that appears in a high frequency of malign files and a high frequency of benign files would not be particularly useful as a malware classifier. Such settings may be adjusted to minimize false positives and false negatives.

As indicated in FIG. 1, the machine-learning trainer 104 may generate the classifiers in a supervised manner—e.g., with a human operator supervising the classification process and results, able to edit, remove and add classifiers, adjust settings that determine how frequently a feature should appear in malign files to be identified as a malware classifier, etc. It is also important to note that the same techniques described above for generating malware classifiers may be used to generate benign file classifiers (e.g., features that are indicative of a file being benign).

With continuing reference to FIG. 1, once an embodiment generates the classifiers, the embodiment may generate a malware classifier 106. A malware classifier 106 may be a database, listing, program, application, routine, programmed logic circuit, or other automated implementation, that includes a combination of the subset of features identified above, by the machine-learning trainer 104, as being most effective at distinguishing between malign and benign files. The malware classifier 106 may be, in turn, utilized by a malware detector 108 to detect malware. The malware detector 108 may be a program, application, routine, programmed logic circuit, or other automated implementation that applies the malware classifier to unknown files 105 to provide an indication of whether the files are malign or benign. The malware detector 108 may produce output that provides an initial estimate of whether a file is malign or benign 109. The initial estimate may be a percentage likelihood that the file is malign. The malware detector 108 may generate this estimate by determining how many features are present in the file and considering (e.g., weighing) the percentage of training malign files in which each given feature was present. For example, if a given feature was found to be present in 95% of all malware files and 0% of all benign files in the training set, the malware detector may consider that feature's presence as indicating a high likelihood that the unknown file was malign. Likewise, if e.g., fifty out of one-hundred features indicative of malware are found in an unknown file, such fact may also indicate a high likelihood that the unknown file was malign.

An embodiment may also generate another form of malware classifier by executing known malign files in the training repository 102 in a sandbox environment and observing the behavior of the executed files and the environment. A sandbox environment is a testing environment, a virtual container, in which untrusted programs can be safely run. The embodiment of a system and method for automated machine-learning, zero-day malware detection, as shown in FIG. 1, may include a machine-learning trainer 110 that executes known malware executables in the sandbox environment and observes execution state data as features to identify precursors and alerting signals of change in software behavior 115 for the malware. The machine-learning trainer 110 may be the same machine-learning trainer described above and may do this without supervision. An embodiment may incorporate the identified precursors and alerting signals into classifiers, while also using a graphical, dynamic visualization of the execution state of malware. When used to detect malware, an embodiment may then execute unknown files in the same or similar sandbox environment 112 or in a live running system (that is not a sandbox). The embodiment may (1) analyze the system calls and/or execution traces generated by the execution of the unknown file to determine what malware features are present in the system calls and/or execution traces and (2) compare the execution state data (e.g., a graphical, dynamic visualization 114 of the execution state data) of the unknown file to the stored precursors and alerting signals to determine if there are likely matches to the execution state data of known malware from the training repository. An embodiment may perform this comparison by comparing dynamic, graphical visualizations 114 of the execution state data of the unknown file and known malware. If such comparisons show similarities or matches, this fact may be used to provide greater confidence that the unknown file is malign.

Figure 2:
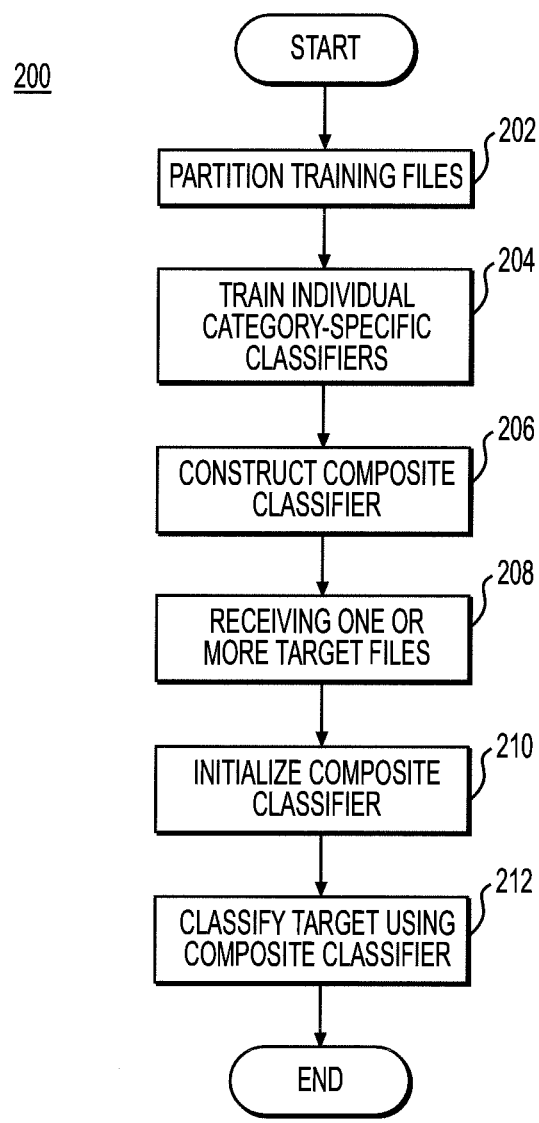
FIG. 2 is a flowchart illustrating an embodiment of an improved method for automated machine-learning, zero-day malware detection using a composite classifier.

With reference now to FIG. 2, shown is an embodiment of a method 200 that provides a composite classifier useful for malware detection that improves on the system and method illustrated in FIG. 1. The composite classifier achieves a significant improvement in accuracy over standard machine-learning malware detection schemes by (1) generating a composite classifier that includes classifiers for categories of files determined by external attributes of files and (2) using an additional pre-screening step prior to application of the composite classifier to determine, from the same or similar external attributes, to which category of file the target unknown file belongs. This pre-screening of the target file under analysis is used to allocate the target file to a classifier specifically tailored to distinguish among benign or malicious files over a narrower category of files (e.g., a single category of files). This process is motivated by the empirical observation that machine-learning classifiers evince superior accuracy when trained and operated on a category of objects of greater homogeneity.

The narrowing of the field of scope of classification is accomplished in three distinct phases:

1. Partitioning of files into distinct categories based on file types representing similarities between composition of the files;
2. Production of category specific classifiers based on the partitions from Phase 1; and
3. The ability to allocate target unknown files (files for analysis) to appropriate categorical classifiers for classification on the fly.

With continuing reference to FIG. 2, the first phase partitions the space of training files into meaningful sets of categories based on, for example, file types (portable executables, pdfs, Word™ document files, Excel™ files, etc.) (block 202). Partitioning 202 of the training files may be a two part process: determine the file type of each training file and group the training files into groups of same-type files. This may be done using a variety of different processes. One way is to simply use the file extension to determine the file type. However, file extensions are not necessarily accurate representations of the file type. An alternate and better way is to build a categorization schema based on the file type as determined by, e.g., the open source software, libmagic, used by the Linux 'file' command. Libmagic uses "magic numbers" (a four-byte number located in the beginning of most file formats to identify the file format) and file structure to determine the file type. This file type is returned by Libmagic as a descriptive string, which then may be parsed to place the file in a hierarchal category. An embodiment may create a category for each 'new' type of file encountered in the training set.

The second phase commences once the space of training files is partitioned 202 into appropriate categories. Individual category-specific classifiers are then trained to distinguish between benign and malicious software within the corresponding category (block 204). In our case, embodiments gather a collection of training files of known class (benign or malicious), all from the same category of file (as determined by partitioning 202), which are used to train (or construct) 204 a training set for the category specific classifier as described in the following: the collection of files in each category undergoes n-gram feature selection and extraction analysis techniques, as discussed above, to construct binary feature vector representations of each file. Feature selection comprises evaluating features of all the files in the category to identify a subset of those that are the most effective at distinguishing between benign and malicious files. An embodiment of the training 204 uses information gain techniques to evaluate these features. As mentioned above, the features are n-grams, ordered sequence of entities (grams) of length n and a gram is a byte of binary data. The feature vector is an ordered list of ones and zeros indicating either the presence, or absence, of an n-gram within the file's binary representation. An embodiment of the training 204 may then use supervised machine-learning algorithms to train ada-boosted J48 decision trees on the training set. Experimentally it has been found that the predictive capacity of these category specific classifiers is greatly enhanced when operating on files of their own category, at the cost of substantial degradation when operating on files of a different category.

These category specific classifiers are then used to construct a composite classifier (block 206). The composite classifier includes three-operational components: a file categorizer, a classifier manifest and a collection of the category-specific classifiers. The classifier manifest maps the file categories to the category-specific classifiers.

With continuing reference to FIG. 2, the third and final phase includes receiving one or more target, unknown files for classification (block 208), initializing the composite classifier (block 210) and classification of target, unknown files via the composite classifier (block 212). During initialization 210 of the composite classifier, the classifier manifest is used to construct a map which connects the file categories with category-specific classifiers. When a received 208 target file is considered for classification the target file first undergoes categorization via the file categorizer, which may use the process described above in phase one to determine the file type and assign that file to a specific file category. After categorization, the classifier map is used to determine which category-specific classifier is applied to the target file. The determined category-specific classifier is applied to the target file. Once the category-specific classifier is finished, the method 200 returns the predicted classification (or probability that a file is malicious) to the composite classifier, which is in turn passed to a calling function or object.

Using method 200, embodiments provide an increased detection rate of a class matching system while simultaneously reducing the false alarm rate. A proof-of-concept composite classifier was constructed using four (4) category-specific classifiers (PDF, PE32 GUI, MS-DOS and PE32-DLL files) and a general classifier trained on a diverse set of files and intended to handle any file not allocated to one of the category specific classifiers. This composite classifier was run against 1.5 million files in a file repository of known malicious and benign files. This test demonstrated that a composite classifier significant increased accuracy versus a similar test run using a classifier that did not include any category-specific classifiers. Overall true positive detection increased from 80% to 90%. Overall false positive rate was reduced from 18% to 7%. Accuracy of detection also improved for the four (4) individual file categories. For example, true positive detection rate for PDF files increased from approximately 2% to 90% while maintaining a false positive rate of under 5%.

Embodiments of an improved system and method for automated machine-learning, zero-day malware detection also include an extensible feature vector generator (EFVG). An EFVG facilitates and manages the addition or removal of attributes, attribute classes, and corresponding feature derivation methods in a machine-learning system. A single attribute or set of attributes may be limited in discriminative power and, therefore, insufficient to adequately design a successful classifier. The use of diverse sets of attributes derived from a variety of attribute classes (e.g., for the case of automated malware detection, extracting n-grams, file-specific content, etc.) has been found to improve classification precision and recall. In embodiments, the EFVG provides a consistent, intuitive, and easily extensible framework for rapid testing, evaluation and incorporation of attributes and attribute classes for classification performance.

Current machine-learning packages or software tools do not make explicit the notion of the attribute class and they do not attempt to provide an extensible framework for deriving features for attributes. Instead, the generation of feature vectors is hard-coded into the system and any changes to the attribute list or to the mechanism(s) for feature derivation could, depending on the complexity of the changes, result in extensive, non-trivial changes to the code or architecture. Furthermore, hard-coding the generation of feature vectors without keeping track of the attributes that each feature corresponds to in a consistent fashion can be a dangerous practice, especially if the feature vector, or the nature in which it is used is inadvertently altered.

Moreover, with the current state of the art it is hard to incorporate features corresponding to new attributes. Typically, feature vectors for machine-learning are "hard coded," meaning that a specific method is tailored to generate the corresponding feature vector corresponding to an object depending on the attributes under consideration. The code for generating the feature vectors has to be changed with new mechanisms for deriving the corresponding features, and the length of the feature vector has to be manually adjusted to reflect this change. This is impractical for classification involving large numbers of attributes; especially if different attributes are used within the same classification mechanisms. For example, n-grams are best used for classifying PE32 executable files, whereas certain file characteristics are best used for classifying pdf files. It is cumbersome to integrate the two feature types into a single classifier. Adding new attributes further complicates the issue. Embodiments of the improved system and method for automated machine-learning, zero-day malware detection also include an EFVG overcome these issues.

In conventional machine-learning, a "feature" is defined as the particular value of an attribute of an object, where each attribute describes an aspect of the object we are attempting to classify (or of the world we are attempting to model). Each feature may be of some type (often referred to as the attribute type), usually binary or numerical. A feature vector is the set of features corresponding to pre-determined attributes that are specially selected for classification purposes. Another way of describing a feature vector is as a collection of attribute values (the features), corresponding to an object (e.g., a file), that is used in classification of that object. A feature vector generator (FVG) derives features (precisely, the values corresponding to the selected attributes) from an object and populates the feature vector with those features.

Typically, attributes are selected that show particularly high "information-gain" distinguishing between the set of objects to be classified (e.g., malicious vs. benign files). There are a number of standard mechanisms to derive the selected attributes. A model is learned from some collection of feature vectors representing that set of objects. The success of a machine-learning system for classification is usually dependent on the choice of attributes, the availability of feature vector instances, and the complexity of the selected model or learning algorithm. As a general rule, however, the more data that is available the better. The richer the set of attributes used the higher the likelihood of creating a successful machine-learning system.

Embodiments introduce "attribute classes" that categorize attributes into different classes, each class with a particular method for deriving or computing the features corresponding to that attribute. The "attribute classes" may be hierarchically organized. The process of identifying or deriving the feature (the value of the attribute) for a given attribute is distinct to an attribute class. For example, an attribute class may be n-gram, where the features are binary values recording the existence of a particular n-gram in a file. These features are best derived via a tree-based search algorithm (e.g., Aho, Alfred V.; Margaret J. Corasick (June 1975). "Efficient string matching: An aid to bibliographic search". *Communications of the ACM* 18 (6): 333-340). Subclasses of the n-gram attribute class include 4-grams, 6-grams, and 10-grams. Other attribute classes may be file size and may involve numerical calculations to derive the features.

Embodiments also introduce an "extended feature vector" (EFV) that comprises the features of an object (e.g., a training or target file) that correspond to these different attribute classes. An EFV may be a concatenation of a number of feature vectors corresponding to different types of features (e.g., in embodiments, n-grams, pdf-objects, pe32 objects, etc.). In embodiments of an improved system and method for automated machine-learning, zero-day malware detection, the EFVG provides a consistent framework for generating EFVs by providing a common interface for (a) specifying new attribute classes and (b) for adding a mechanism for deriving the features corresponding to the attribute class. In an embodiment, the EFVG draws upon individual FVGs to generate feature-type-specific feature vectors and then concatenates these feature-type-specific feature vectors into an EFV.

Figure 3:
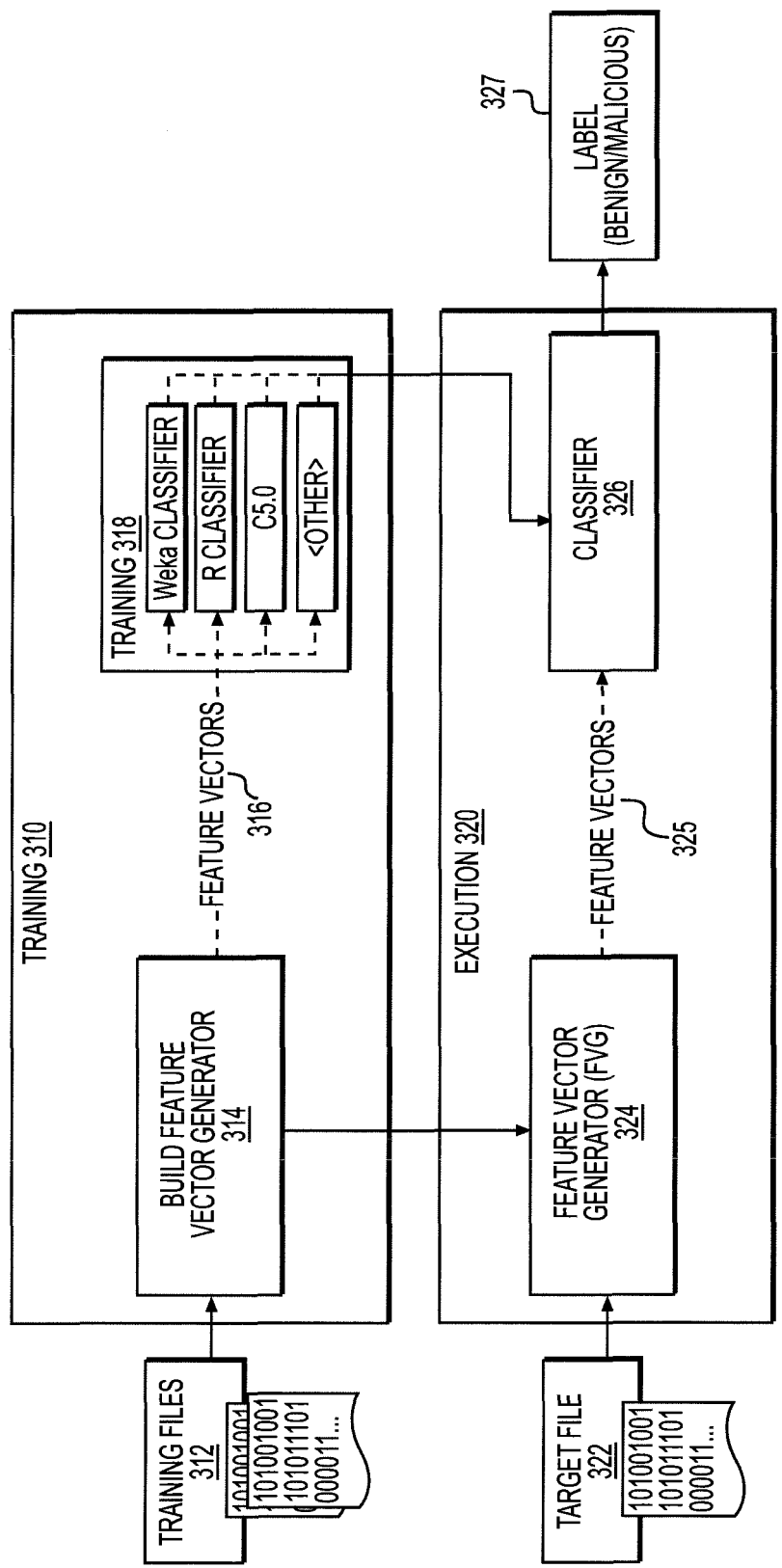
FIG. 3 is a block diagram illustrating an embodiment of a system and method for automated machine-learning, zero-day malware detection.

With reference now to FIG. 3 shown is an embodiment of a system 300 for automated machine-learning, zero-day malware detection that relies on a basic machine-learning system. System 300, which may also be referred to as a malware detector pipeline, includes a training component 310 and an execution component 320. Training component 310 builds classifier from a set of training files 312 (e.g., training repository 102 from FIG. 1). Training files 312 include known malware files and known benign files. A FVG 314 analyzes the training files 312 and produces training feature vectors 316. Supervised machine-learning algorithms are then applied by trainer 318 to the training feature vectors to build classifier 326, such as ada-boosted J48 decision trees, used in execution component 320. Execution component 320 receives target file 322, analyzes target file and generates feature vectors 325 with FVG 324 (which may be same FVG used in training component 310) and analyzes generated target file feature vectors with classifier 326. Classifier 326 outputs a benign or malicious label 327 for the target file based on this comparison. As described above with reference to FIG. 1, this output may include a calculated percentage likelihood or confidence level that target file is malicious (or benign).

Figure 4A:
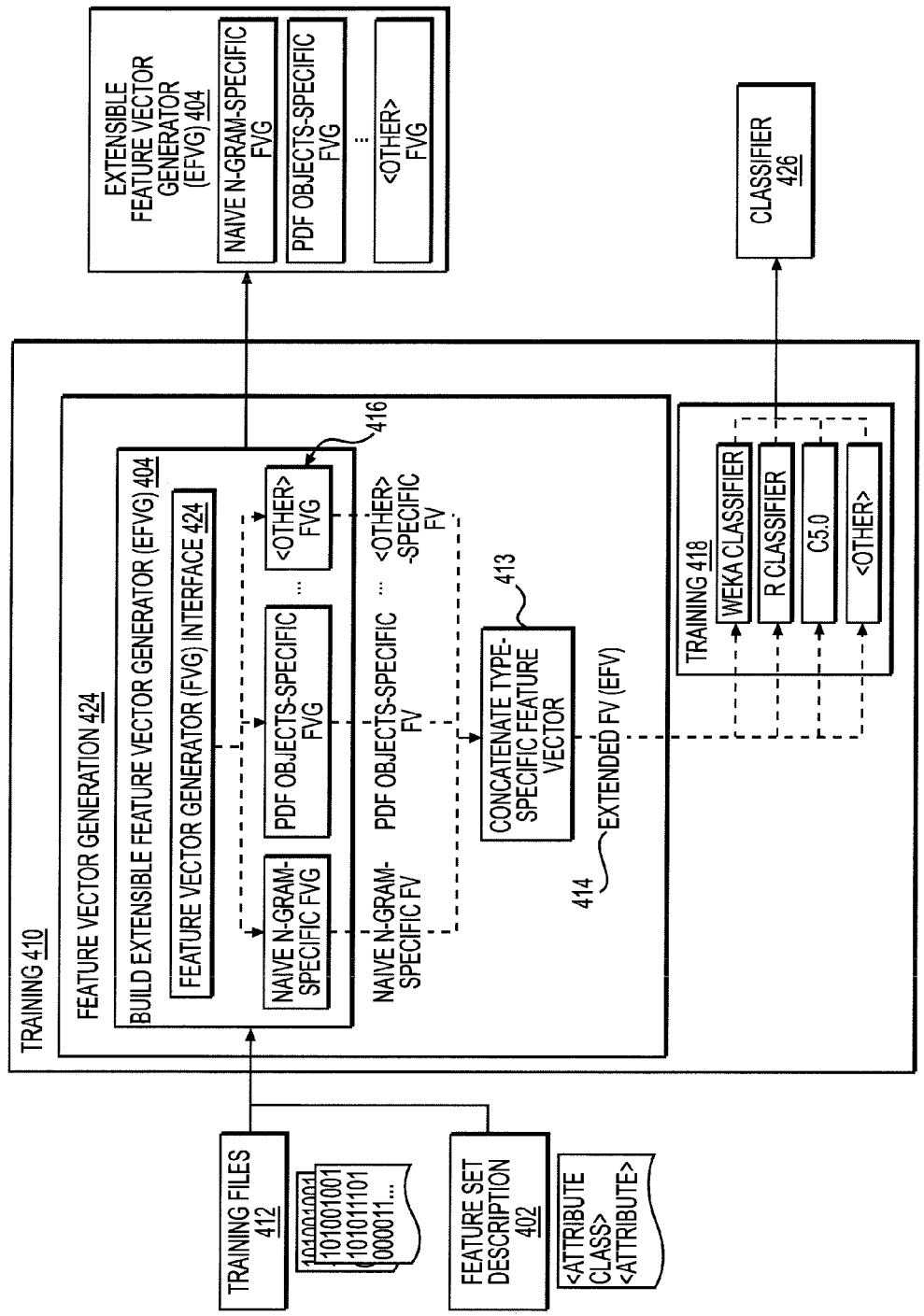
FIGS. 4A and 4B are block diagrams illustrating embodiments of an improved system and method for automated machine-learning, zero-day malware detection utilizing an extensible feature vector generator (EFVG).
Figure 4B:
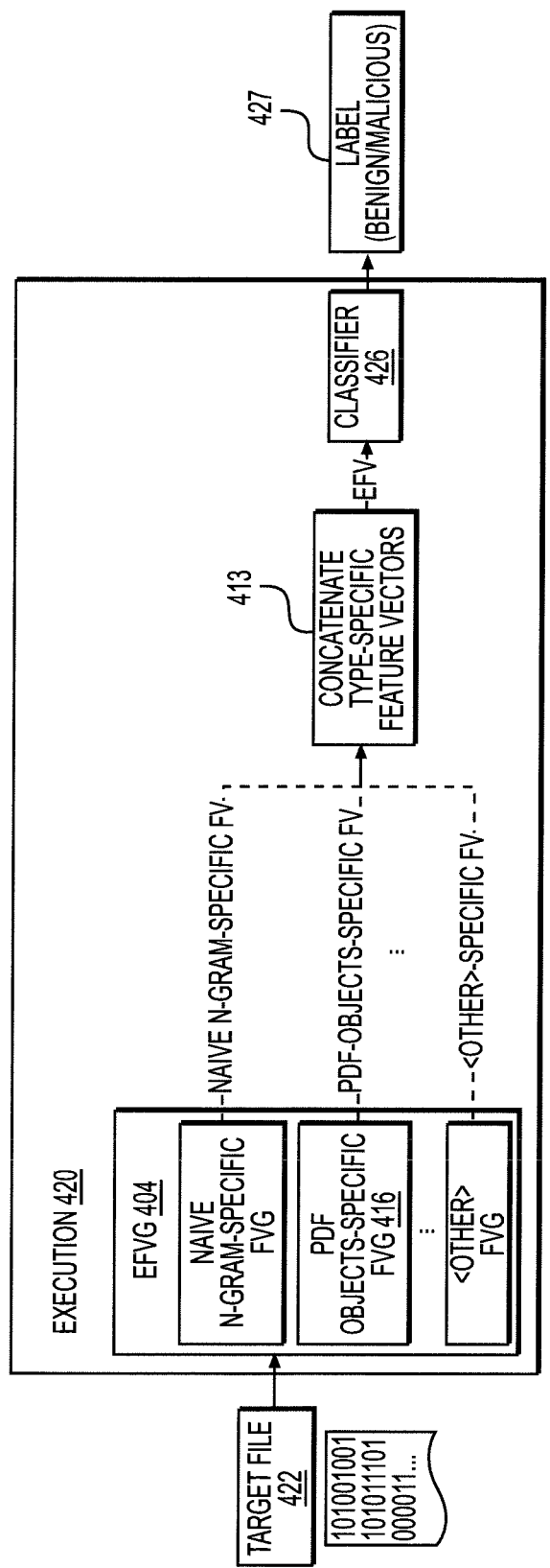

With reference now to FIGS. 4A and 4B, shown is an embodiment of an improved system 400 for automated machine-learning, zero-day malware detection that incorporates an EFVG. Embodiments of system 400 operate by adding two components to the basic machine-learning system:

1. A supplementary feature set description file 402 that, in no particular order, lists the semantic label or descriptive representation of an attribute and a specified computer-represented attribute class to which it belongs;—this mapping is generally determined once by a human user; and 2. An extensible feature vector generator superclass 404 (for any object-oriented programming language) that provides a method for:
   a. Parsing the supplementary feature set description file 402 and creating a data structure comprising, for each attribute class, the attributes and their associated values as key-value pairs; and
   b. Computing the extended feature vector for a target object, given semantic labels corresponding to the attribute class and the mechanism by which the features are derived.

In embodiments, there is one (1) FVG per attribute class and the EFV is constructed by concatenating the feature vectors corresponding to the individual attribute-classes. As shown in FIG. 4A, training component 410 receives training files 412 and supplementary feature set description file 402 and uses EFVG 404 to build training EFVs 414. The EFVG 404 includes attribute class-type FVG 416, including a naïve n-gram-specific FVG, a PDF objects-specific FVG, and other FVGs. FVGs 416 may each include a type-specific algorithm indicating input variables (the file), output variables (the attributes) and the mechanism from which the output is derived from the input (e.g., Aho-Corasick pattern matching). Different FVs will use different algorithms for their construction, so the algorithms are type-specific to the FV. EFVG 404 concatenates the type-specific feature vectors 413 into the training EFVs 414. Trainer 418 builds classifier 426 from training EFVs 414. With reference to FIG. 4B, execution component 420 utilizes EFVG 404 to analyze target file 422. If multiple feature vectors are generated for a target file (e.g., an n-gram FV and a pdf objects FV), EFVG 404 concatenates the type-specific feature vectors 413 and classifier 426 analyzes this concatenated feature and outputs a benign or malicious label 427 for the target file based on this comparison. As described above with reference to FIG. 1, this output may include a calculated percentage likelihood or confidence level that target file is malicious (or benign). The EFVG 404 may be re-used during testing and prediction (classifying).

As indicated in FIG. 4A-4B, EFVG 404 provides a consistent reusable framework for adding new attributes, attribute classes, and feature derivation routines. In embodiments, this framework does not rely on any particular ordering of the attributes or attribute classes within the supplementary feature set description file 402, since they are parsed and organized internally prior to feature vector generation. Adding the supplementary feature set description file 402 and feature vector generator objects 416 alleviates the problem of extensive re-architecting and re-coding feature vector generation and obviates any inadvertent alteration of the derived feature.

Figure 4C:
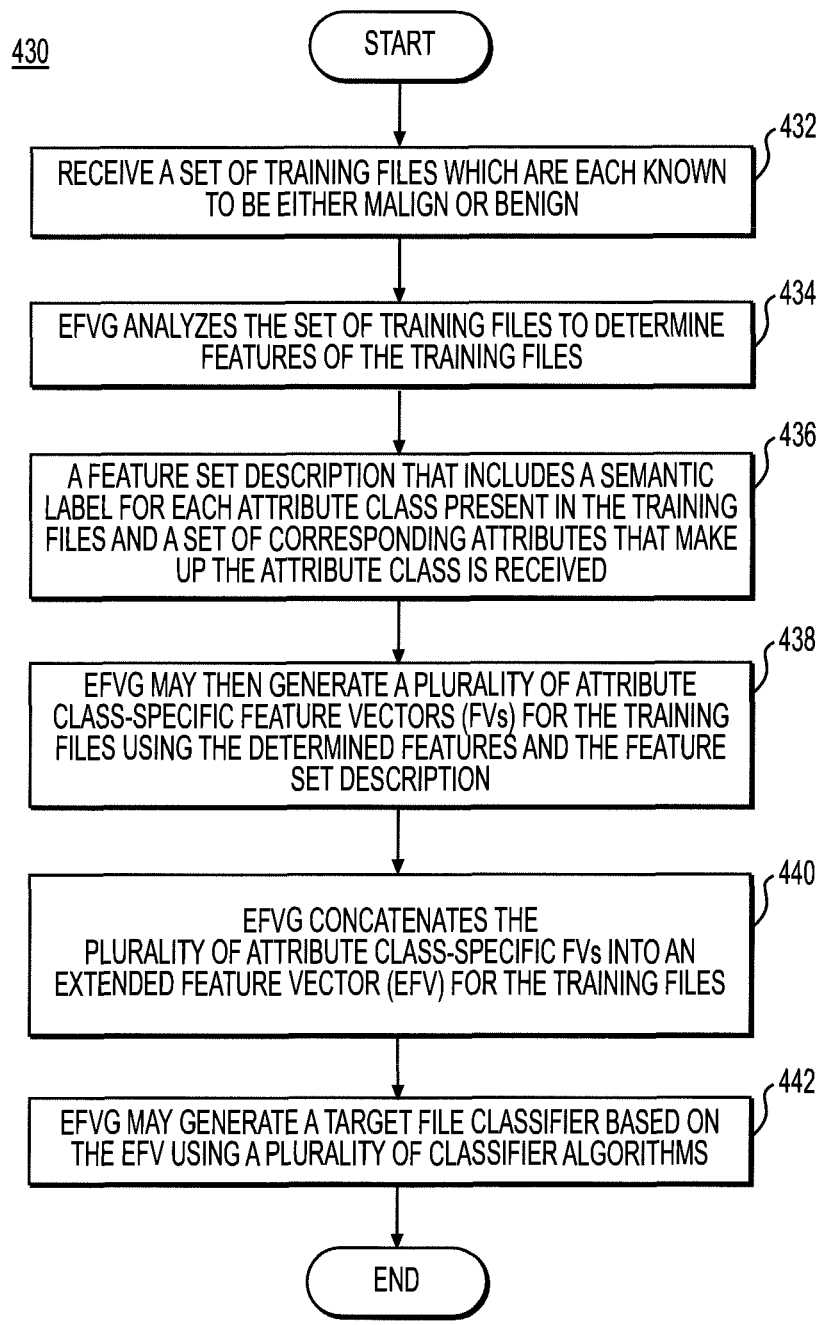
FIG. 4C is a flowchart illustrating an embodiment of an improved method for automated machine-learning, zero-day malware detection utilizing an EFVG.

With reference now to FIG. 4C, shown is an embodiment of a method 430 for improved zero-day malware detection that utilizes EFVG. As shown, method 430 receives a set of training files which are each known to be either malign or benign (block 432). EFVG analyzes the set of training files to determine features of the training files (block 434). A feature set description that includes a semantic label for each attribute class present in the training files and a set of corresponding attributes that make up the attribute class is received (block 436). EFVG may then generate a plurality of attribute class-specific feature vectors (FVs) for the training files using the determined features and the feature set description (block 438). The FVs are vectors of features present in malign files of the attribute class. EFVG concatenates the plurality of attribute class-specific FVs into an extended feature vector (EFV) for the training files (block 440). EFVG may generate a target file classifier based on the EFV using a plurality of classifier algorithms (block 442).

With continuing reference to FIGS. 4A-4C, during training, a classifier can be presented with any combination of attribute classes, comprising any number of attributes. Concretely, for every attribute class $f_i$, i=1, 2, . . . m, there is a list of corresponding attributes $\{a_1, a_2, \ldots, a_{N_i}\}$, where m: # of considered attribute classes and $N_i$: # of attributes correspond ing to the $i^{th}$ attribute class. This data can be presented in many ways. Two possible methods are:
   Files: these can be .csv, .tsv, .txt, .arff, etc which must then be parsed
   Key-value pair containers with keys referring to attribute class, and values referring to a list of attributes.

One particular way of representing the attribute classes and attributes is through the "attribute-relation file format" (.ARFF file). The .ARFF file is a ASCII text file that describes a list of instances sharing a set of attributes, developed by the Machine-Learning Project at the Department of Computer Science of the University of Waikato for use with the open source WEKA machine-learning software. An embodiment of the improved system and method for automated machine-learning, zero-day malware detection including an EFVG may modify the .ARFF file format and use the modified .ARFF file to present the attribute data. The attribute-relational file format contains three sections, marked by the three words @relation, @attribute and @data. The @relation section provides meta-data information about the file and the dataset, the @attribute section contains a list of the semantic labels of the attributes and corresponding attribute type (numeric, string, etc), and finally, the @data section contains a feature vector corresponding to the attributes listed in the @attribute section. An embodiment of the improved system and method for automated machine-learning, zero-day malware detection including an EFVG adds a comment to each line of each attribute, denoting the "attribute class," i.e., the type of feature to which the attribute pertains. Alternatively, attribute may include dedicated field for the attribute class so that attribute class is not included in the comment field. This comment field may be used by the EFVG to identify the mechanism to be used to calculate the value (i.e., the feature) corresponding to this attribute. By including this comment, the attribute-relational file can be parsed to create a data structure that holds key-value pairs of attribute classes and sets of attributes comprising that class. Once this data structure is constructed, all feature vectors can be generated consistently. Moreover, by including this comment, the order of attributes can be arbitrary and new additions require minimal effort to change within code. Further, this comment makes transparent which attribute belongs to what attribute class. The current .ARFF file format, without this comment, would require the order of attributes in the @attribute section to be kept constant in order to avoid extensive code changes and would make it difficult to tell which attribute belongs to which class.

Figure 5:
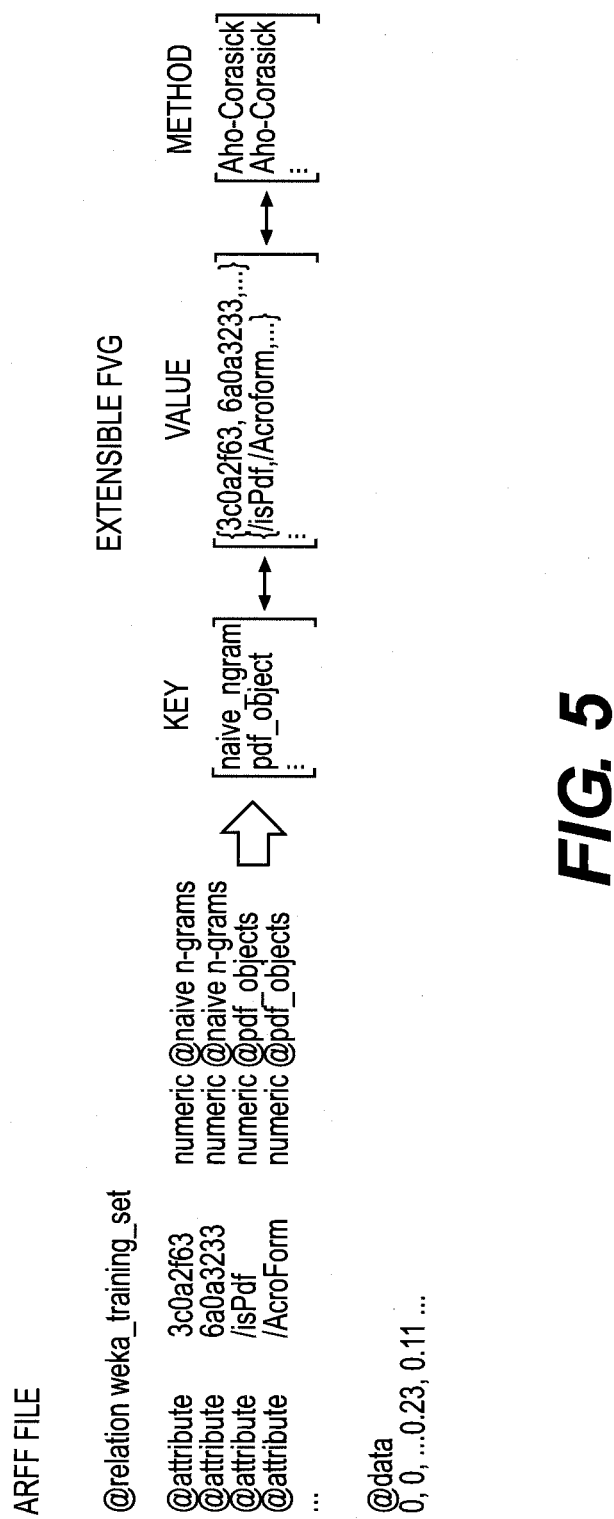
FIG. 5 is a diagram illustrating an extensible feature vector (EFV) used in an embodiment of an improved system and method for automated machine-learning, zero-day malware detection utilizing an EFVG.

As noted above, the EFVG provides a consistent framework to take any combination of attributes from a variety of attribute classes to construct an extended feature vector. Embodiments reorganize each file (or data structure) internally into "feature-type"—"set of attributes" key-value pairs, and stores the method for deriving the features for the attributes corresponding to a given attribute class in the EFVG. FIG. 5 provides an illustration of this process.

It is also noted that embodiments of the EFVG are particularly useful in implementing the improved system and method for automated machine-learning, zero-day malware detection that provides a composite classifier useful for malware detection as described above with reference to FIG. 2. Embodiments of the improved system and method that that provides a composite classifier useful for malware detection may use a wide variety of EFVs depending on the particular file types considered.

Embodiments of an improved system and method for automated machine-learning, zero-day malware detection include a qualified meta-features (QMFs) feature extraction algorithm for increasing accuracy and reducing "false positive" errors of automated malware detection systems. QMF extraction supports machine-learning systems that learn classes of malware by example and that extract features to build decision models that automatically recognize malware, such as the embodiments described herein. Most feature extractors for malware systems merely extract n-grams and use those counts as features. QMF extraction surpasses those systems by fully qualifying the features in terms of function and architecture, transforming ordinary features into qualified meta-features.

Embodiments of an improved system and method for automated machine-learning, zero-day malware detection that includes QMF extraction enhance the feature-extraction mechanisms employed by automated malware detection systems to increase the specificity or precision of the system while also boosting the specificity or recall. In other words, embodiments will classify true malware more accurately, while committing fewer errors of mistaken identity ("false positive" errors). Embodiments using QMF extraction may operate in a way similar to other machine-learning based malware detectors, such as those described above or in Kolter-Maloof, by extracting byte-code patterns (n-grams) from examples of malicious and benign (non-malicious) files in a training set.

In other words, embodiments utilizing QMF extraction may operate like other machine-learning malware detectors, using 'learning by example' to find salient byte-code sequences which implicate malicious behavior. However, unlike other detectors, QMF extraction further qualifies these salient features with unique tags which strengthen the confidence of the implications and reduce false alarms. In embodiments, QMF extraction further qualifies each byte-code pattern extracted by the patterns purpose or location in the file from which it is extracted. This qualification provides an additional context for conditioning the machine-learning models used by such embodiments, enhancing accuracy and reducing false alarms caused by contextual errors in interpreting the patterns. One aspect of novelty of the embodiments utilizing QMF extraction is in how the integration of salience and qualification takes place.

To extract or derive QMFs, embodiments draw upon additional metadata about the file that describes the type of file and layout of the file's major components. The file-type and components serve as additional context for detecting malicious files using qualified pattern features. The components used to qualify QMF feature sets depend on the file type of the example being used for training.

For example, two of the most common file formats involved in malware exploits are Window Portable Executable 32-bit (PE32) and Adobe Portable Document Format (PDF). Consequently, features derived from of each of these formats are qualified by location and function according to the layout of the major components of each file type.

Specifically:

For PE32:

Qualified by location: Headers, Dictionaries, Sections, "gaps"

Qualified by function: Code and Data

For PDF:

Qualified by location: Header, Cross-Reference Index, Embedded file

Qualified by function: Form, Execution Action

For unknown files: default to Boolean feature, n-gram present (or not):

Qualified by location: {QMF value=1 if present, else 0}

Qualified by function {QMF value=1 if present, else 0}

In an embodiment, specific QMF tags for the PE32 format are shown in the following lookup table of representative QMF tags:

| QMF Tag: | Description |
|---|---|
| 0: | Pattern not present (Boolean) |
| HDR: | Part of header |
| CODE: | Part of executable code section |
| DATA: | Part of data section |
| JAT: | Import Address Table |
| DIR: | A "directory" pointed to from header |
| Z: | Anything that can't be classified to one of the above |

These tags are intended to define long contiguous regions within each file, in which major sections of header, code and data reside. By adding the 'Z' tag, all bytes in each file can be accounted for (even if not recognized).

The definitions are applied while searching each training file and extracting byte-patterns. When a salient byte pattern is found, its offset in the file is used to determine the appropriate QMF tag from a mapping table, such as the one below, which may be produced in a pre-preprocessor that scans every PE32 file prior to pattern extraction. Consequently, the offsets may vary from file to file.

| OFFSET IN File: | QMF TAG |
|---|---|
| 60: | HDR |
| 176: | HDR |
| 200: | HDR |
| 228: | HDR |
| 296: | HDR |
| 424: | DIR |
| 464: | HDR |
| 504: | HDR |
| 544: | HDR |
| 584: | HDR |
| 1024: | z |
| 14341: | z |
| 14381: | IAT |
| 14848: | CODE |
| 20145: | z |
| 51856: | DATA |
| 86528: | z |

The qualification then proceeds by applying the QMF tag for the current offset in the file to the extracted pattern. In embodiments, the QMF tagging may take place in one of two essentially equivalent ways:

Features can be 'qualified' by "prefixes" or "feature value" that denote the functional context of the feature, consequently reducing errors caused by contextual mismatches. For example, an n-gram prefix may denote function or location, e.g.:

"76616c69"=>C76616c69 (qualified by function: "code");

"76616c69"=>D76616c69 (qualified by function: "data"); and

"76616c69"=>H76616c69 (qualified by location: "header"); or

If mutual exclusion can be applied, the QMF tag can be an n-gram "feature value," e.g.:

"76616c69"=>{C, D, H} (qualified by value, according to function or location).

The resulting QMF qualified features (extracted features tagged with QMF tags) may then be used as feature vectors, replacing the Boolean-valued feature vectors normally employed for this purpose. QMF extraction and the QMF tag does not interfere with the effectiveness of the extracted features. All byte codes extracted from the same kind of string data will have the effectiveness as before. QMF extraction eliminates accidental matching with features that are not string features, therefore reducing the false alarms and other misclassifications. QMF extraction also permits low-entropy features (e.g., 0x00000000) which normally are useless for malware detection to have increased classification power.

Figure 6:
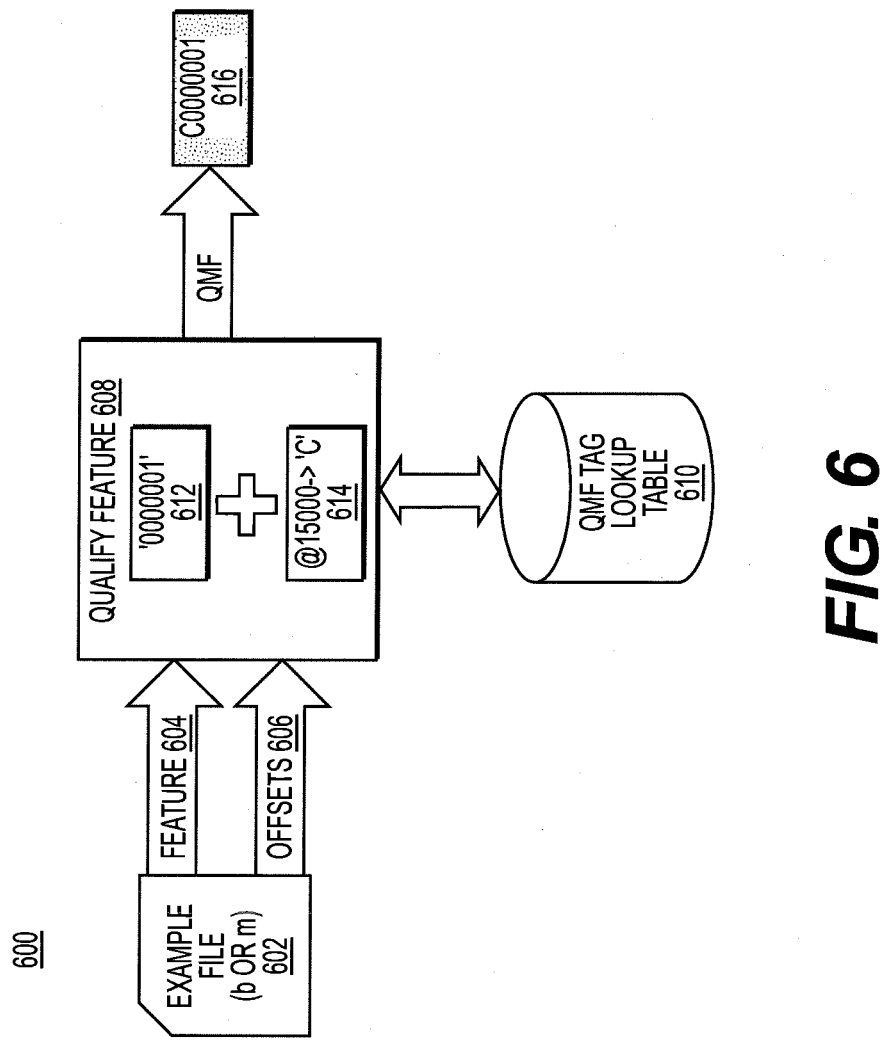
FIG. 6 is a diagram illustrating an embodiment of an improved system and method for automated machine-learning, zero-day malware detection using qualified meta-features (QMF).

With reference now to FIG. 6, shown is an embodiment of an improved system and method 600 for automated machine-learning, zero-day malware detection that includes QMF extraction. In embodiment shown only a portion of system 600 is shown, specifically QMF extraction portion. In an embodiment, an example file 602, which may be benign (b) or malign (m), is analyzed. A feature 604 and a feature offset 606 are extracted from file 602. Embodiments also pre-process the example file 602 to determine the offsets for each component of the file 602 and to generate a mapping table, as described above. Qualifier 608 qualifies the extracted feature 604 by determining the location of the feature 604 from the feature offset 606 and determining the appropriate tag from the mapping table (not shown) and a QMF tag lookup table 610. In the embodiment 600 shown, the extracted feature 604 is "0000001" 612 and the offset is @15000 614. From the mapping table shown above, 15000 falls in the range of 14848 to 20144. Consequently, the extracted feature 604 is part of the executable code section of example file 602. Qualifier 608 qualifies or tags extracted feature 604 with QMF tag for code (e.g., "C") and outputs QMF "C0000001" 616.

Figure 7A:
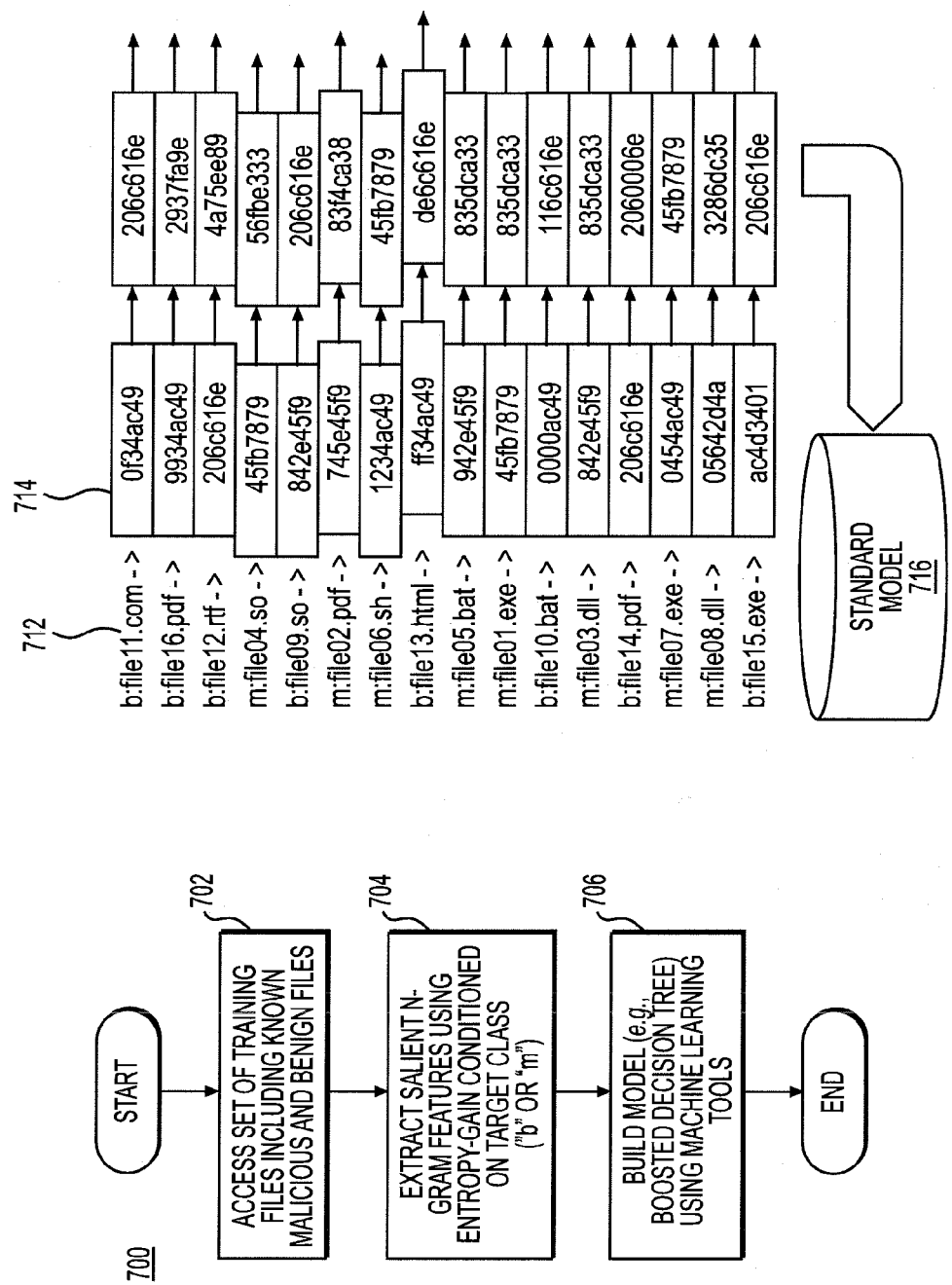
FIG. 7A is a flowchart and diagram illustrating an embodiment of a system and method for automated machine-learning, zero-day malware detection not using QMF.

With reference to FIGS. 7A and 7B, shown is a comparison of a malware detection using non-qualified features, such as described in Kolter-Maloof, and QMF as in the embodiment described here. As shown in FIG. 7A, method 700 of malware detection using non-qualified features accesses training set of known malicious (m) and benign (b) files 712 (e.g., training repository 102) (block 702), extracts salient n-gram features 714, e.g., using entropy-gain conditioned on the target class (block 704), and builds a model 716 (e.g., a boosted decision tree) using machine-learning tools (block 706). As shown in FIG. 7B, method 750 using QMF features accesses training set of known malicious (m) and benign (b) files 712 (e.g., training repository 102) (block 752), extracts QMFs 764, e.g., extracts salient n-grams using entropy-gain conditioned on the target class and adds QMF attribute or tag (block 754), and builds a QMF model 766 (e.g., a boosted decision tree) using machine-learning tools (block 756). In FIG. 7B, the added qualified meta features are indicated by shading (i.e. stipling) and hatching the corresponding features. If a feature is shaded, it occurs in a particular section of the file (say DATA). If a feature is hatched, it occurs in a different section of a file (say CODE). The hatching and shading serves as a graphical representation that a feature may occur in more than one context in the file. A representative mechanism implementing the QMF may, for example, append the feature with an additional 2-byte sequence representing the context of the file in which the feature is observed. The "Standard" Kolter-Maloof (non-improved) as seen in FIG. 7A has no hatching at all, as it does not qualify the n-grams with additional features. For example, in method 750, the feature "45fb7879" occurs twice in shade and twice with cross-hatching in FIG. 7B, indicating that this feature occurs in two different uses in the file. In a representative implementation of the mechanism, the feature 45fb7879 may thus be tagged and represented as CODE45fb7879 and DATA45fb7879, if it occurs in CODE and DATA sections of the file, respectively. There are many other ways, such as key-value pairs, to assign the tags to the features, thereby creating the qualified meta-features. Features shown in embodiment of method 700 in FIG. 7A are purely binary (i.e., not multi-valued). In method 700 a feature is coded as "1" if it is present in the file. In both method 700 and method 750, a feature is coded as "0" if the feature is not present.

By using QMF tags that indicate what section of a file a feature is extracted from, the same feature (e.g., n-gram value 00000001) can be used to qualify more than one class (e.g., both benign and malign files) or different types of files (pdf and PE32).

Using QMF extraction provides many advantages, as described above. Compare to an automated machine-learning, zero-day malware detection utilizing Boolean n-gram features without QMF:

Boolean n-gram Features

Simple and robust because it makes no assumptions about the function or location of an n-gram ("architecture-free");

Susceptible to false-negatives because the n-grams detected tend to be very rare (and therefore carry high entropy-gain); and Will not detect very common (low-gain) n-grams (e.g. 0x00000000, 0xffffffff) because they serve many different functions.

Qualified Meta-Features (QMF)

Meta-Features qualified by function or location, therefore it is architecture-dependent This qualification, however, makes it possible to recognize malicious byte-patterns with very low entropy-gain.

QMF should be able to recognize, for example, malicious n-grams with the pattern 0x00000000, given discriminating qualification.

Testing of embodiments of improved system and method for automated machine-learning, zero-day malware detection using QMF have shown improvements in accuracy and reductions in false alarm rates versus system and method for automated machine-learning, zero-day malware detection using Boolean n-gram Features without QMF.

Figure 8:
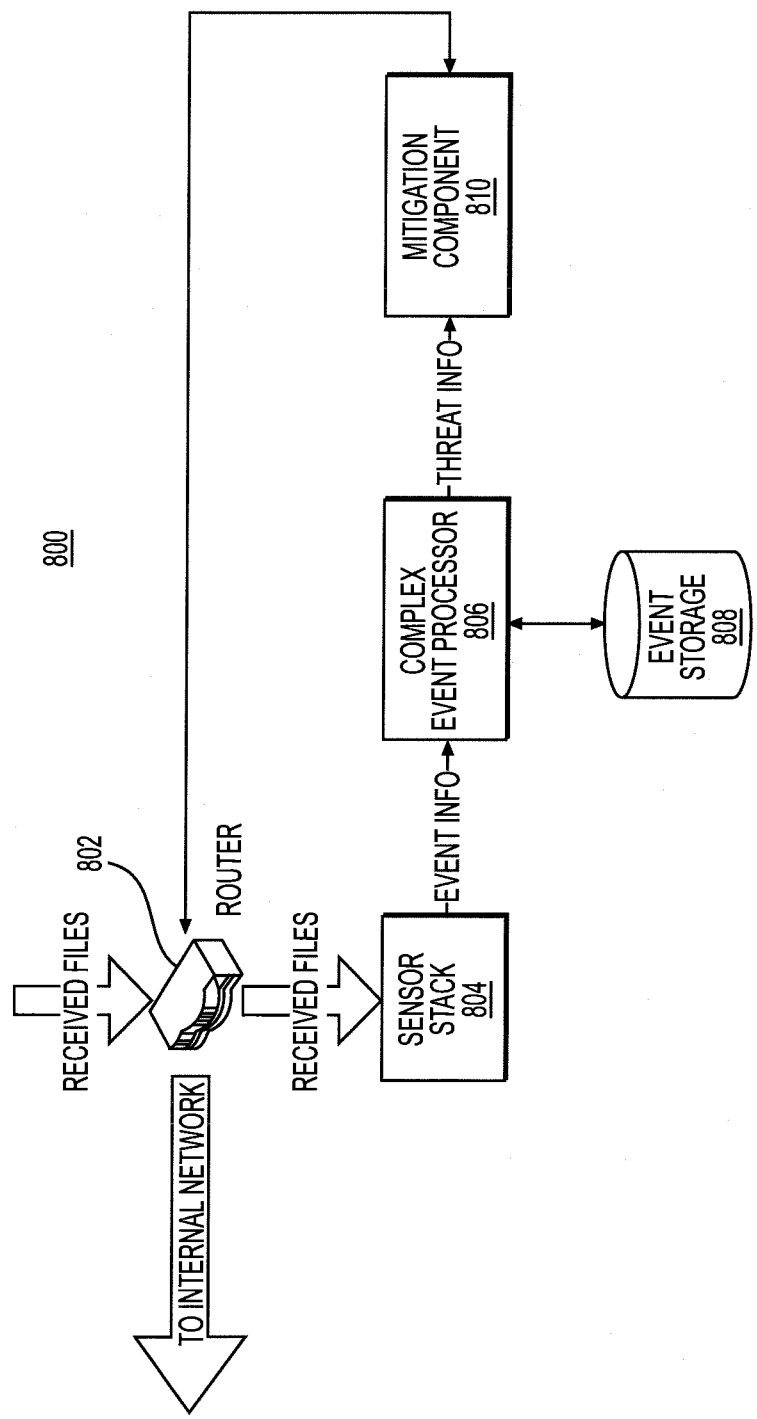
FIG. 8 is a block diagram of an embodiment of a system for malware detection and defeat utilizing embodiments of an improved system and method for automated machine-learning, zero-day malware detection described herein.

With reference now to FIG. 8, shown is an embodiment of a system 800 for zero-day security event detection and mitigation that may incorporate embodiments of improved system and method for automated machine-learning, zero-day malw are detection described herein. Such a system 800 detects security events, such as malware or network intrusions, processes such events and issues commands aimed at mitigating such events. System 800 receives files from a router 802. System 800 may also receive attempted access information and other information relevant to determining whether a security event is occurring or has occurred. Specifically, sensor stack 804 receives such files and other security event information. Sensor stack 804 may include one or more sensors that incorporate or implement embodiments of improved system and method for automated machine-learning, zero-day malware detection described herein. Such embodiments may include improved system and method for automated machine-learning, zero-day malware detection including a composite classifier, EFVG and/or QMF. Sensor stack 804 may also include other security event sensors, including commercial-off-the shelf sensors. Sensor stack 804 outputs information indicating a detected security event to an analysis cell. Such security event information may include an output from one or more embodiments of improved system and method for automated machine-learning, zero-day malware detection described herein indicating a degree of likelihood that a received file is malware. Consequently, the security event information outputted will include an identification of the suspected malware file, the source of the suspected malware file and the calculated likelihood that the file is malware.

System 800 includes an analysis cell. Analysis cell includes a complex event processor (CEP) 806 and event storage database 808. Complex event processor 806 analyzes security event information received from sensor stack 804. For example, CEP 806 may analyze an indication of a degree of likelihood that a file is malware and the source of the suspected malware file. CEP 806 may implement a number of algorithms, including a reputation scoring algorithm and a probably next event algorithm. For example, CEP 806 may access information, from event storage 808, on past security events from the source of the suspected malware file. Other information about the source as well as the suspected malware file itself may be stored in event storage 808 or elsewhere and may be analyzed. Based on this information, CEP 806 may calculate a reputation score of the source and use that to make a determination whether the suspected malware file is actually malware and, therefore, is actually a security event. For example, if the source is a trusted partner of the entity implementing system 800 known to have good security measures, CEP 806 may give the source a high reputation score. This score may be used to determine that file does not represent a security event unless the likelihood that it is malware is sufficiently high. Additionally, if CEP 806 determines that the file represents a security event (it is malware), CEP 806 may calculate a probable next event based on past security events from source. This allows CEP 806 to instruct appropriate mitigation. CEP 806 may also calculate a security event threat level based on these calculations.

CEP 806 may store data on the suspected security event using key value in the event storage 808 to best enable the execution of CEP algorithms. CEP 806 may also receive follow-up data on post-mitigation (or non-mitigation) efforts to append to data about an analyzed and stored event. By storing data in event storage 808, CEP 806 may continually learn from security events (non-events) as they occur and are analyzed.

CEP 806 outputs security event threat information and mitigation instructions to mitigation component 810. In embodiments, mitigation component utilizes border-gateway protocol (BGP) messaging to mitigate determined security events and the effects thereof. CEP 806 may configure mitigation efforts and instructions for mitigation component 810 based on reputation scores and threat levels that it determines. Mitigation component 810 takes appropriate mitigation actions based on this information and instructions. For example, mitigation component may instruct router 802 to block all files and other access from identified source.

Figure 9:
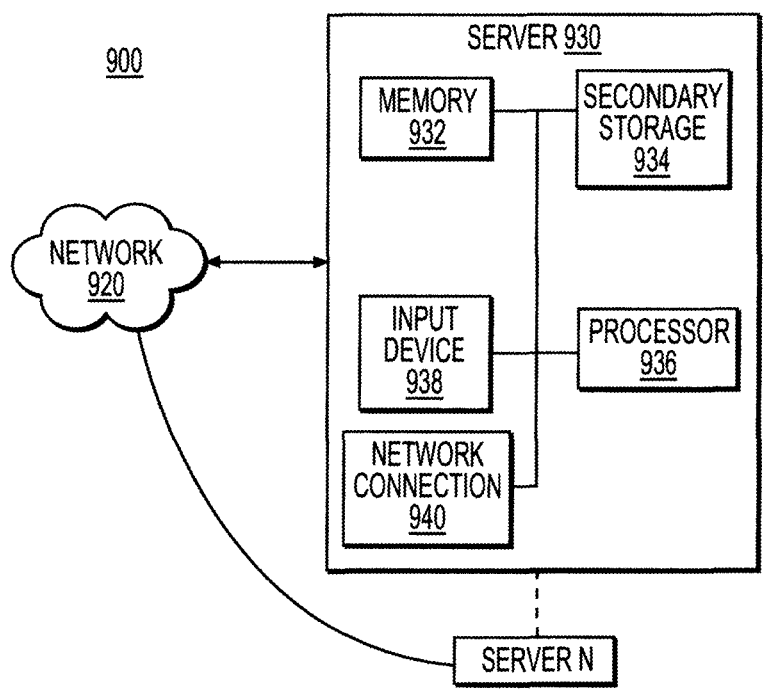
FIG. 9 is a block diagram of an exemplary hardware system that may be used to implement methods and systems described herein.

With reference to FIG. 9, shown is a block diagram of exemplary hardware that may be used to implement embodiments of an improved system and method for automated machine-learning, zero-day malware detection described herein. For example, hardware shown in FIG. 9 may store and execute programs, applications and routines and perform methods described herein. Embodiments may be implemented with any of a variety of hardware implementations including multiple server arrangements, cloud arrangements, etc. System 900 may include a one or more servers 930 connected with a network 920 such as the Internet.

Server 930 typically includes a memory 932, a secondary storage 934, one or more processors 936, an input device 938, and a network connection 940. Memory 932 may include RAM or similar types of memory, and it may store one or more applications for execution by processor. Secondary storage 934 may include a hard disk drive, CD-ROM drive, flash drive, thumb drive or other types of non-volatile data storage. Processor(s) 936 executes the application(s), which are stored in memory or secondary storage, or received from the Internet or other network, and the processing may be implemented in software, such as software modules, for execution by computers or other machines. These applications preferably include instructions executable to implement the systems and perform the methods described herein, including those described with reference to FIGS. 1-8. Input device 938 may include any device for entering information into server, such as a keyboard, mouse, cursor-control device, touch-screen, microphone, digital camera, etc. Network connection 940 provides connection(s) for connecting to one or more networks (e.g., mobile network, Internet, internal network, etc.).

Server 930 may store a database structure in secondary storage 934, for example, for storing and maintaining data used in the embodiments of an improved system and method for automated machine-learning, zero-day malware detection described herein. Also, processor 936 may execute one or more software applications in order to provide the functions described in this specification, specifically in the methods described herein, and the processing may be implemented in software, such as software modules, for execution by computers or other machines. The processing may perform methods described herein and produce output of methods for display by computers connected to server 930. Optionally, the server 930 may itself comprise a display device and/or an output device. A display device may include any type of device for presenting visual information such as, for example, a smart phone screen, computer monitor or other flat-screen display. The display device may display output of the methods described above. An output device may include any type of device for presenting a hard copy of information, such as a printer, and other types of output devices include speakers or any device for providing information in audio form.

Although only one server 930 is shown, system 900 may use multiple servers 930 as necessary or desired to support the users and may also use back-up or redundant servers to prevent network downtime in the event of a failure of a particular server. Cloud computing servers may also be used. In addition, although server 930 is depicted with various components, one skilled in the art will appreciate that these machines and the server can contain additional or different components. In addition, although aspects of an implementation consistent with the above are described as being stored in memory, one skilled in the art will appreciate that these aspects can also be stored on or read from other types of computer program products or computer-readable media. The computer-readable media may include instructions for controlling a computer system, such as machine and server, to perform a particular method, such as methods described herein.

Although the methods disclosed throughout this disclosure describe in detail identification and/or detection of malignant files, similar methods may alternatively or additionally be employed to identify and/or detect benign files.

The terms and descriptions used herein are set forth by way of illustration only and are not meant as limitations. Those skilled in the art will recognize that many variations are possible within the spirit and scope of the invention.

What is claimed is:

1. A computer-implemented method for improved zero-day malware detection comprising:
    receiving, at a computer that includes one or more processors and memory, a set of training files which are each known to be either malign or benign, wherein the training files comprise one or more types of computer files;
    analyzing, using the one or more computer processors, a training file from the set of training files to determine features of the training file, wherein the analyzing determines n-gram features;
    tagging, using the one or more computer processors, the determined features of the training file with qualified meta-features (QMF) tags, wherein the tagging includes:
        extracting one of the determined n-gram features from the training file;
        identifying a location of the extracted n-gram feature in the training file;
        determining an appropriate QMF tag of the extracted n-gram feature based on the identified location;
        applying the determined QMF tag to the extracted n-gram feature; and
        repeating the extracting, identifying, determining and applying for the remaining determined n-gram features of the training file;
    repeating the analyzing and tagging for remaining training files in the set of training files; and
    building, using the one or more computer processors, a model identifying n-gram features indicative of a malign file using the QMF-tagged n-gram features, wherein the model is capable of being used to detect malign files.

2. The method of claim 1 wherein the analyzing further comprises determining offsets for the determined features, wherein the offsets indicate the location of the determined features in the training file.

3. The method of claim 2 further comprising generating, using the one or more computer processors, a mapping table that maps ranges of feature offsets to sections of the training file.

4. The method of claim 3 wherein the sections of the file include header section, executable code section, and a data section.

5. The method of claim 3 wherein the determining an appropriate QMF tag determines the appropriate QMF tag using the mapping table and the QMF tag indicates the file section of the extracted feature.

6. The method of claim 1 further comprising
    receiving, using the one or more computer processors, one or more target, unknown computer files for classification; and
    classifying, using the one or more computer processors, the one or more target, unknown computer files as malign or benign using the model.

7. The method of claim 6 wherein the classifying includes extracting features of the one or more target, unknown files and tagging the extracted features with QMF tags.

8. The method of claim 7 wherein the classifying classifies the one or more target, unknown files as malign based on QMF-tagged features of the one or more target, unknown files matching QMF-tagged features from the training files.

9. A non-transitory computer readable medium including instructions thereon for performing the method for improved zero-day malware detection of claim 1.

10. A system for improved zero-day malware detection comprising:
    a processor for executing instructions; and
    a memory that includes instructions thereon that when executed perform the method of claim 1.

11. A computer-implemented method for improved zero-day malware detection comprising:
    receiving, at a computer that includes one or more processors and memory, a set of training files which are each known to be either malign or benign, wherein the training files comprise one or more types of computer files;
    analyzing, using the one or more computer processors, the set of training files to determine features of the training files, wherein the analyzing determines n-gram features;
    receiving, using the one or more computer processors, a feature set description that includes a semantic label for each attribute class present in the training files and a set of corresponding attributes that make up the attribute class;
    generating, using the one or more computer processors, a plurality of attribute class-specific feature vectors (FVs) for the training files using the determined n-gram features and the feature set description, wherein the FVs are vectors of n-gram features present in malign files of the attribute class;
    concatenating, using the one or more computer processors, the plurality of attribute class-specific FVs into an extended feature vector (EFV) for the training files; and
    generating, using the one or more computer processors, a target file classifier based on the EFV using a plurality of classifier algorithms.

12. The method of claim 11 wherein the analyzing the set of training files includes extracting determined features from the training files.

13. The method of claim 11 further comprising:
    receiving, using the one or more computer processors, a target, unknown computer file;
    analyzing, using the one or more computer processors, the target, unknown computer file to determine features of the target, unknown file;
    generating, using the one or more computer processors, a plurality of attribute class-specific FVs of the target, unknown computer file using the determined features of the target, unknown file;
    concatenating, using the one or more computer processors, the plurality attribute class-specific FVs of the target, unknown computer file into an EFV for the target, unknown computer file; and
    classifying, using the one or more computer processors, the target, unknown computer file as malign or benign by applying the target file classifier to the EFV of the target, unknown computer file.

14. The method of claim 11 further comprising parsing, using the one or more computer processors, the feature set description and defining a data structure that holds the attribute classes and sets of corresponding attributes as key-value pairs.

15. A non-transitory computer readable medium including instructions thereon for performing the method for improved zero-day malware detection of claim 11.

16. A system for improved zero-day malware detection comprising:
   a processor for executing instructions; and
   a memory that includes instructions thereon that when executed perform the method of claim 11.

* * * * *